United States Patent [19]

Hoopman

[11] 4,100,617
[45] Jul. 11, 1978

[54] MIXING AND DISCHARGE APPARATUS

[75] Inventor: Abraham Hoopman, Aalten, Netherlands

[73] Assignee: Hoopman Onderzoek & Ontwikkeling BV, Netherlands

[21] Appl. No.: 702,430

[22] Filed: Jul. 6, 1976

[30] Foreign Application Priority Data

Jul. 9, 1975 [DE] Fed. Rep. of Germany ....... 2530553
Oct. 21, 1975 [DE] Fed. Rep. of Germany ....... 2546975

[51] Int. Cl.² .............................................. B01F 9/06
[52] U.S. Cl. ...................................... 366/188; 366/50; 366/186
[58] Field of Search ...................... 259/3, 30, 175, 176, 259/177 R, 169, DIG. 31

[56] References Cited

U.S. PATENT DOCUMENTS

| 1,825,614 | 9/1931 | Eggert | 259/176 |
| 1,928,380 | 9/1933 | Jaeger | 259/176 |
| 2,277,518 | 3/1942 | Jaeger | 259/176 |
| 2,895,722 | 7/1959 | Hunkins | 259/176 X |
| 3,064,948 | 11/1962 | Hallberg | 259/30 |
| 3,269,707 | 8/1966 | Phillips | 259/30 |
| 3,604,688 | 9/1971 | Schuler | 259/97 |

*Primary Examiner*—Robert W. Jenkins
*Attorney, Agent, or Firm*—Fitch, Even, Tabin & Luedeka

[57] ABSTRACT

A mixing and discharge apparatus is used to mix various feed constituents and to discharge the feed mixture while the vehicle travels. A low energy demand for mixing purposes is provided by eliminating the usual rotary screws or agitators and using solely conveyor plates fixed to the inner wall of the drum for turning with the drum to mix the feed and for conveying the mixture toward the discharge end of the drum. The discharge of the agglutinated feed mixture is facilitated by the use of a cover means which may be shifted to form an annular gap with the drum to provide an accurate metering of the discharge feed mixture. A crossfeed conveyor receives the discharge mixture. Overlapping apertures on the cover of the drum may be used to discharge liquid constituents in a controlled manner.

3 Claims, 12 Drawing Figures

MIXING AND DISCHARGE APPARATUS

The feed mixing vehicles according to the present invention are employed to initially mix various feed constituents upon supplying them into the vehicle in the desired proportions, and then to discharge such feed constituents or feed mixture while the vehicle travels, e.g., along troughs or mangers in order to continuously fill the troughs with the desired quantities while the vehicle travels. As feed constituents, there may be used both raw feed, silo feed of corn, rapes, turnips, grass and similar materials, and albuminous (protein-containing) feed materials, such as formed by crushed beans, crushed soya beans, molasses, also in pelletized condition, or other protein-bearing substances. Mineral substances may be added too.

However, the subject matter of the invention may be used also in stationary or non-stationary applications to mix any desired materials difficult to be mixed with each other, and to discharge such materials after the mixing process.

The conventional mixers suffer from the disadvantage that they operate either with rotary screws (worms) or with agitators, and that the energy demand for the mixing process is disproportionately high. Furthermore, it is disadvantageous in such mixing apparatuses that the discharge of bridge-forming mixtures can be effected incompletely and with difficulty only, and that liquid mixtures having a high content of solids tending to precipitate, cannot be discharged uniformly. Now, it has been found that particularly the protein-containing substances and molasses cause sticking of the other feed constituents such that not only the mixing of the feed components requires extremely high forces to be exerted, but also the discharge operation is greatly aggravated. When the mixed feed is discharged, e.g., by means of screws, the agglutinated feed composition forms bridges such that almost all of the feed is retained in the vehicle.

Therefore, the conventional mixing and discharge apparatuses are inefficient and expensive, and their operation is unsatisfactory.

Accordingly, it is the object of the present invention to provide a mixing and discharge apparatus which is capable of operating both in stationary and non-stationary fashion, which is suitable not only to mix all types of mixtures with lowest possible energy or power demand, but also to uniformly discharge such mixtures, and which, furthermore, is easy to operate and of economical construction.

In accordance with the present invention, this object is solved in that the opening of said mixing and discharge apparatus has disposed thereat a cover being attached for co-rotation or stationarily and which cover, at least in its lower peripheral portion, is adapted to be adjusted with respect to its spacing relative to the edge of the drum, and that spiral or screw-type conveyor plates are provided within the drum on the inner periphery thereof.

Advantageously, a transporting or distributing device is disposed below the gap defined by the adjustment of the spacing.

Other advantageous embodiments of the subject matter of the present invention are apparent from the enclosed claims.

Surprising to the expert, but decisive to the success of the apparatus according to the invention, is the fact that regardless of the great bridge formation, for example, in the mixed feed, rotation of the container automatically results in a sufficient quantity being discharged at the sides or at one side, and that it is just such bridge formation that provides for an accurate metering of the discharged mixed feed within the annular gap between the cover and the container ends.

In stationary application, the present mixing and discharge apparatus is likewise useful for the mixing of feed materials, but also for chemical industry, foodstuff industry and feed manufacturing plants, as well as for brickworks and the like. In non-stationary applications, a correspondingly designed apparatus, in addition to the distribution of (animal) feed, may be used for the scattering of lime, manure, fertilizer and the like in agriculture.

Below, exemplary embodiments of the present invention are explained in greater detail by referring to the accompanying drawings, wherein.

Figure 11:
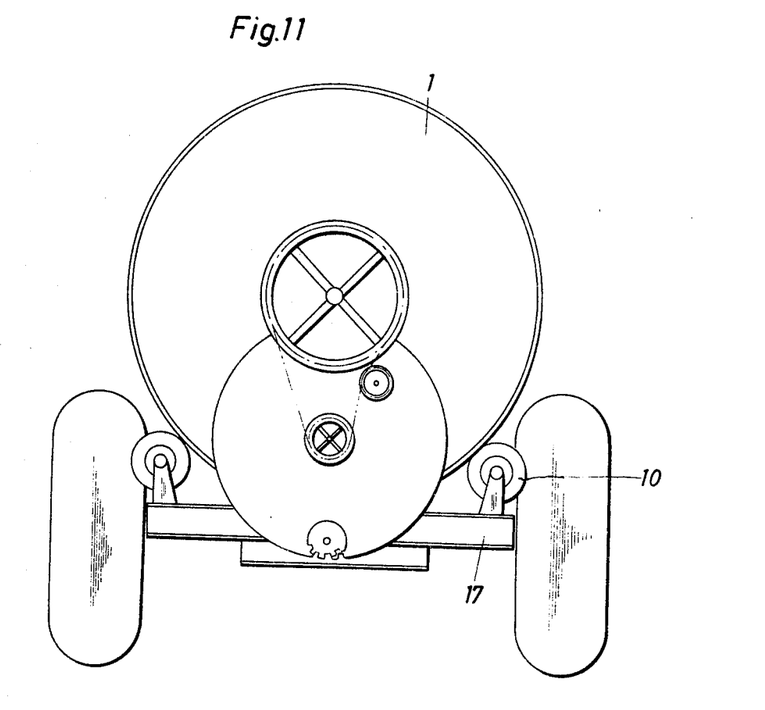
FIG. 11 shows a mixing and discharge vehicle according to the present invention, provided with hydraulic drive means.
Figure 12:
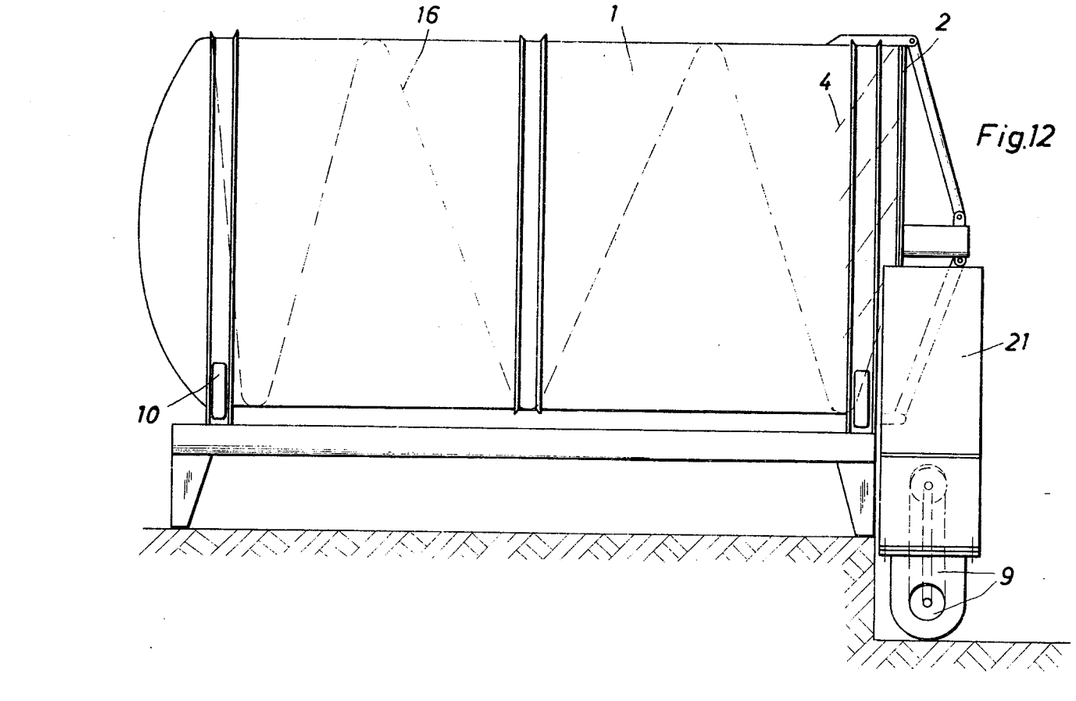
FIG. 12 shows a stationary mixing apparatus.

As shown in the FIGURES, the mixing and discharge apparatus according to the present invention comprises a cylinder or drum 1 which is supported by a plurality of bearing rollers 10 mounted to a frame 17. The drum carries tracks 13 serving to positively prevent displacement of the drum relative to the rollers 10 during rotation. Alternatively, the rollers may be driven; however, power transmission in order to rotate the drum or container may be effected by a gear through a ring gear mounted to the periphery of the drum, or by a sprocket provided at the front end of the drum (FIG. 11).

The frame 17 may be either stationary or mounted on a chassis, whereby such frame may be designed so as to be pivotable in a vertical plane.

The rear end of the drum 1 is closed by a cover 2 which may be designed either to rotate with the drum or to be fixed against rotation with the drum. Below the gap formed between the rim 19 and the cover 2, there is provided a distributing or transporting (conveying) device which might comprise an endless conveyor belt or a conveyor screw.

With the drum 1 mounted on a chassis, a conveyor screw or worm 9 may be employed as the transporting or distributing device for directly distributing the discharged mixture, said conveyor screw 9 being movable or rotatable perpendicularly to the longitudinal axis of the drum 1 in tracks 14 by means of laterally mounted wheels or gears. The direction of rotation of this screw 9 is reversible, and the screw is slidable in lateral direction. By such sliding displacement, the material may be discharged both at the right end and at the left end of the drum, as required.

When used as a mixing and discharge vehicle, both the rollers 10 and the conveyor screw 9 are adapted to be driven by the power take-off shaft of a tractor through drive shafts. As the moment of inertia of the filled, stationary drum is high, a slip-type clutch may be installed in the drive train, which clutch in the case of an excessive torque exerted by the prime mover prevents damage to the power transmission components.

In another embodiment, the drum and the screw may also be driven by hydraulic motors, while a hydraulic pump for pumping the required hydraulic fluid is disposed at the front end of the vehicle and adapted to be driven by the power take-off shaft of the tractor.

The drum 1 includes a rectangular peripheral aperture or opening which may be closed by a pair of cover halves 15. The cover halves 15 each cover one half of the openings, and they are formed with a curvature corresponding to the curvature of the drum 1. Supports 18 limit the degree of opening of the cover halves such that these components are then opened in the fashion of a hopper or funnel. A latch (not shown) closes the cover halves 15 for rotation of the drum.

For charging, the container (drum) is then rotated to such extent that the opening 3 remains locked below the hopper 5, and the cover halves 15 are opened. When charging with the container 1 in stationary state has been completed, the cover halves 15 may be re-closed, optionally after removal of the hopper 5. Then, upon releasing the latch, the container is rotated such that the distribution of the feed composition may be effected after a short period of mixing. The charging of granular feed may be performed as desired prior to or after the charging of the silo feed.

For the charging of the drum, the hopper 5 may be placed onto the chassis when the drum is to be filled, and this hopper may be removed during the distribution process as required, if the height of the vehicle is otherwise too high or if the hopper is of such construction as to impede rotation of the container 1.

The container 1 includes on one end or on both ends thereof a cover 2 each, the spacing of which cover with respect to the container may be continuously varied (even during travel) by hydraulic, mechanical or electric motor means from the tractor means of the vehicle. This cover is attached to the respective end face, and it serves to control the discharge.

The cover 2 may be moved in a stationary state towards the rim 19 of the drum and away therefrom in the direction of the longitudinal axis of the drum 1; on the other hand, the cover may be adapted to be opened at its upper edge only, such that the cover in such instance, so-to-speak, swings open and closed.

Both in the stationary and in the rotatable constructions, the cover 2 may include a cylindrical, continuous peripheral rim 12 overlapping the edge 19 of drum 1. The rim 12 may be provided with apertures 11 which may be disposed at a higher level on one side than on the other side. Depending on the direction of rotation of the drum 1 the direction of rotation of which is reversible, discharge is effected more or less through the higher or lower apertures 11. The overlapping rim 12 provides sufficient sealing such that even mixtures containing a substantial quantity of liquid constituents may be mixed and discharged in controlled manner. Hereby, the slow opening movement of the cover 2 may provide an incremental opening of the apertures 11 in the form of gaps or slits only, such that very acccurate metering is rendered possible.

Figures 9, 10:
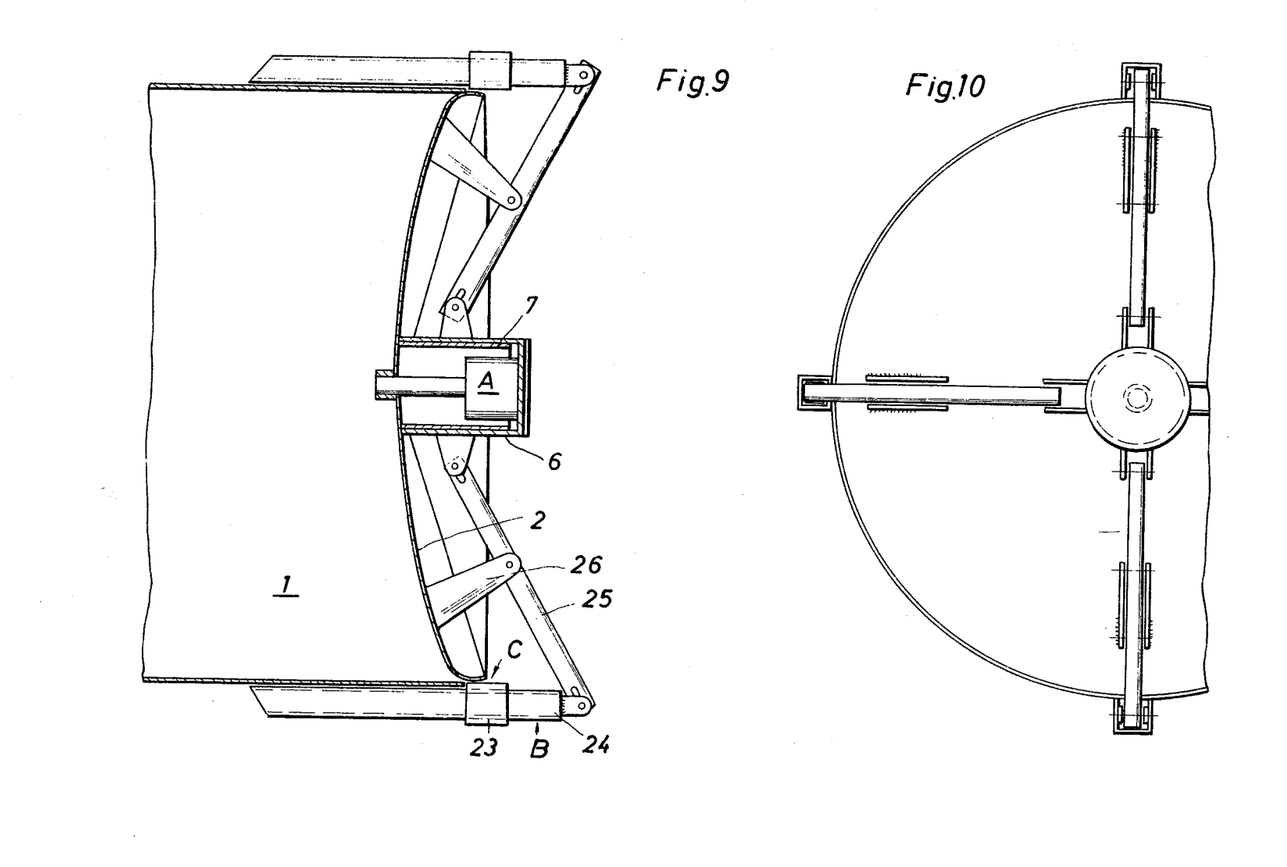
FIG. 9 shows an inwardly curved cover including its respective operating mechanism.
FIG. 10 is a rear view of the mechanism of FIG. 9.

As shown in FIGS. 9 and 10, an inwardly curved cover 2 mounted for rotation with the drum is supported by radial links 25 pivoted at both ends, which links adjacent the center thereof are pivoted to stays or anchoring means 26 which, in turn, are fixedly secured to the cover 2. The outer ends of links 25 are pivoted to guide rods 24 mounted in guides 23 on the periphery of cover 2. The innermost ends of links 25 are pivoted to a cylinder 6 slid over a piston 7 which is secured to the center of the cover 2. The piston-cylinder assembly 6 and 7 is of the double-acting type, and the hydaulic fluid controlling the movement of such assembly is supplied thereto via not illustrated coaxial pipes rotating with the drum. Rods 24 are secured to the periphery of drum 1.

When the piston-cylinder assembly 6, 7 is operated, the cover is moved inwards or outwards at one half of the differential speed within the piston-cylinder assembly. In such movement, guides 23 slide along the guide rods 24.

Further, it is left to the expert's discretion to provide the screws 9 and covers 2 on both ends, namely, both at the front end and at the rear end of the vehicle, so that the user of the vehicle has the chance of converting the apparatus in accordance with the various possibilities. For example, a conveyor device 8 attached to the rear end permits the vehicle to be moved in reverse direction against a rear wall of the stable without restraint.

Interiorly of the container 1, conveyor (sheet metal) plates are mounted, said plates having a low height and a web-like configuration so as to form an inner screw or worm. Depending on the desired discharge from one end or both ends of the vehicle, the conveyor plates 16 may extend across the full length of the vehicle with the same pitch or with opposite pitches. The height of the conveyor plates may be relatively small, as the actual longitudinal conveyance is effected by the revolution of the feed material due to rotation of the container and the plates are only provided in order to transport the residues left in the container. Obviously, these plates do not impede the thorough cleaning of the container. Adjacent the opening, there are additionally arranged a number of shorter baffle plates 4 serving to intensify conveyance of the material towards the opening at this point.

In another embodiment of the present invention, it is also possible to tilt the container about its longitudinal axis, as required. Such tilting may be performed by well-known, simple hydraulic means, whereby emptying of the container can be facilitated. The same applies to the mixing process.

Rotation of the container and driving of the conveyor device 8 may be initiated and controlled centrally through a hydraulic system from the tractor. In particular, it is also possible to control from the tractor the spacing of the covers 2 from the edges of the container 1 to a degree as required for providing different discharge characteristics when emptying the container and for decreasing the annular gap. Evidently, however, an unproblematic, easy and efficient control of the discharge operation or a corresponding metering operaton can be readily obtained, and in view of the high mixing performance provided by the rotation it may be stated that the feed mixing and distributing vehicle according to the present invention represents an ideal solution to the existing problems in spite of, or actually due to, its simple structure.

Figure 1:
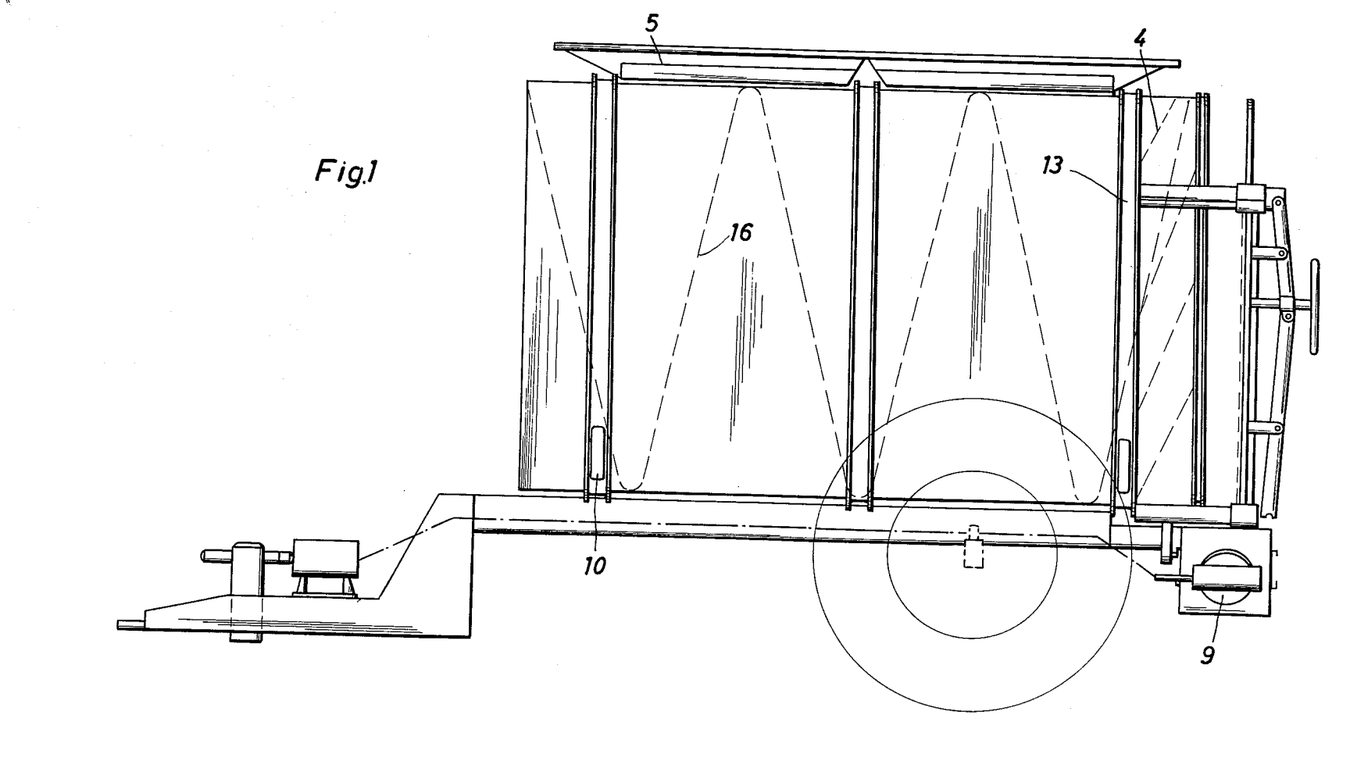
FIG. 1 is a schematical side elevational view of a vehicle according to the present invention.
Figure 2:
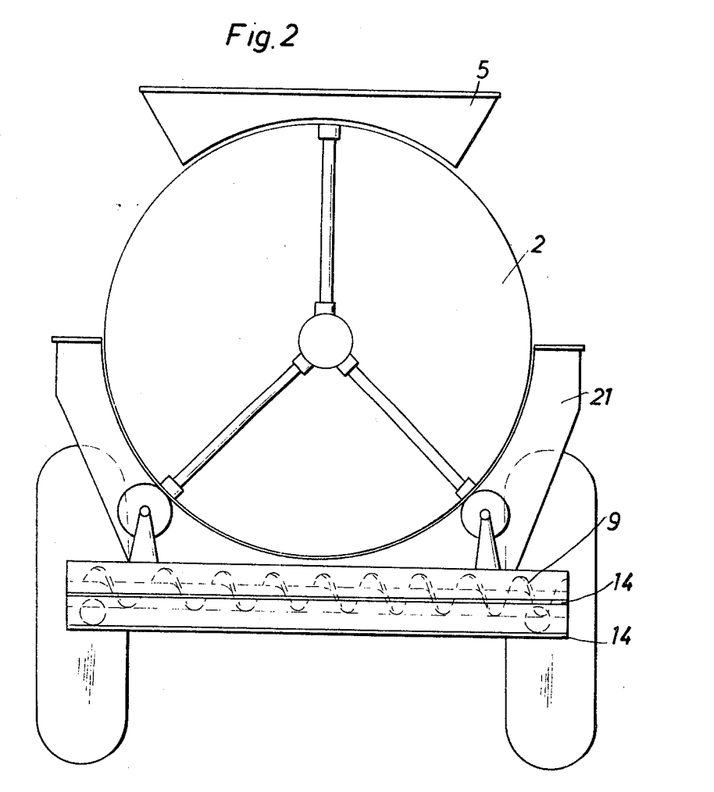
FIG. 2 is a schematical rear view of the vehicle of FIG. 1.
Figure 3:
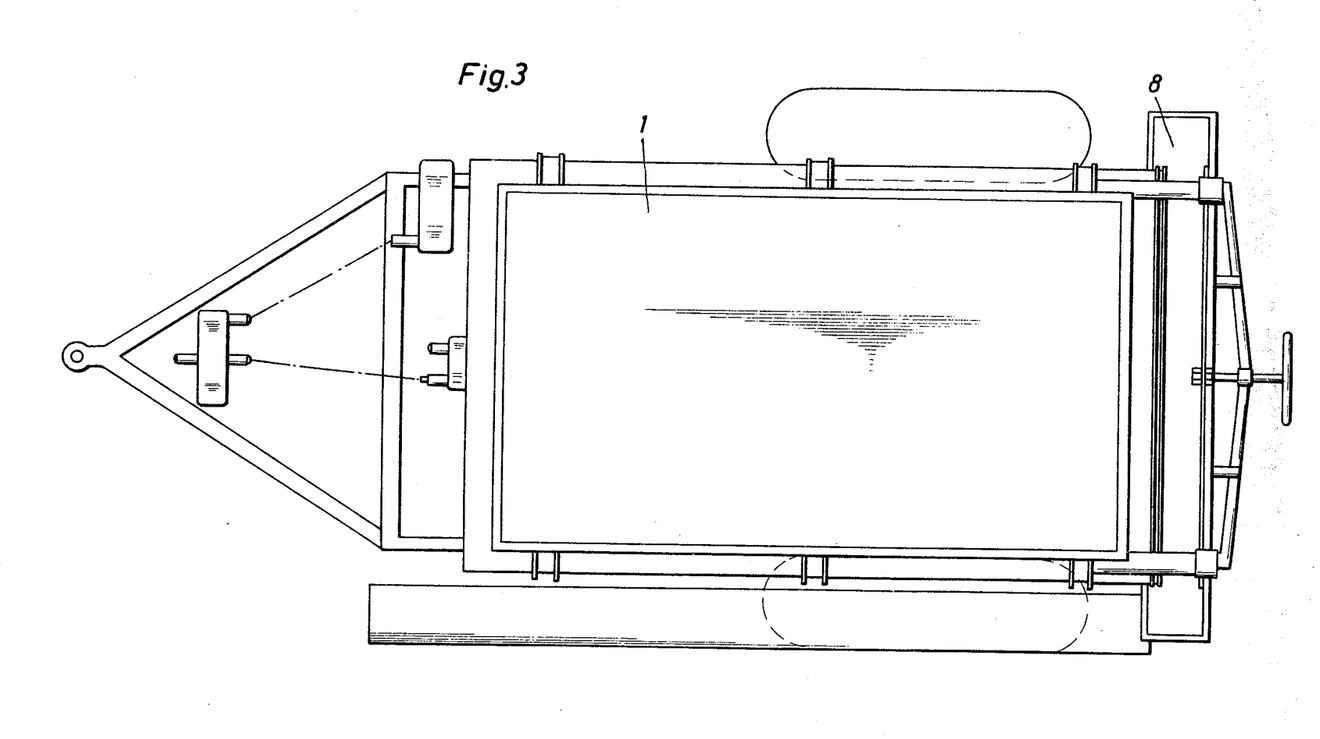
FIG. 3 is a plan view of the vehicle having a hopper placed thereonto.
Figure 4:
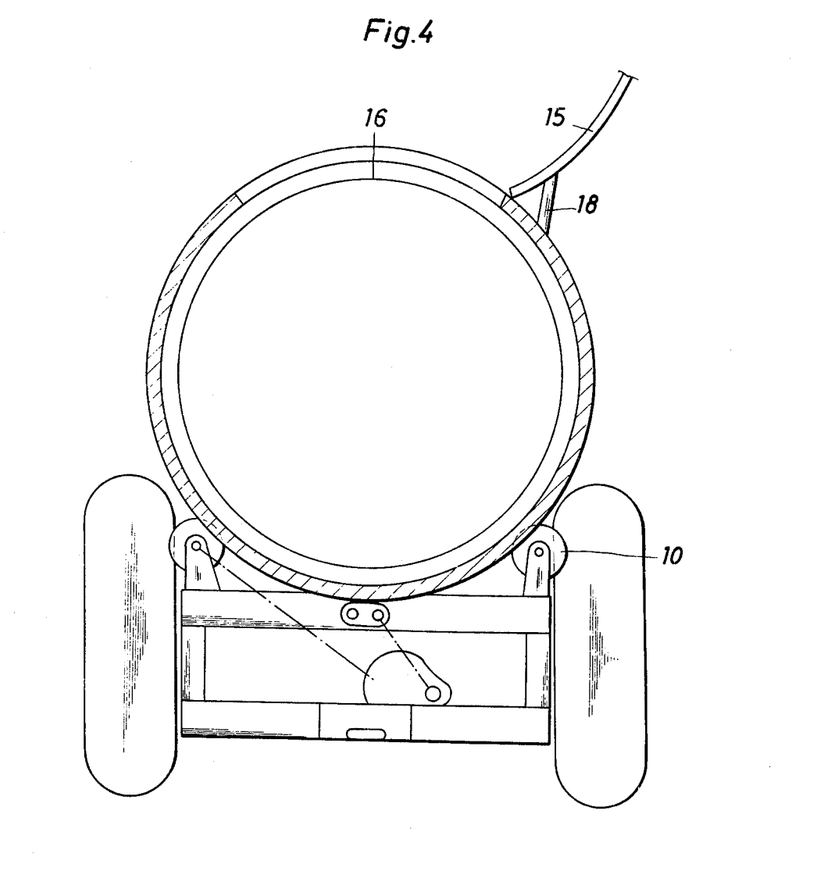
FIG. 4 is a cross-sectional view of a vehicle according to the present invention.
Figure 5:
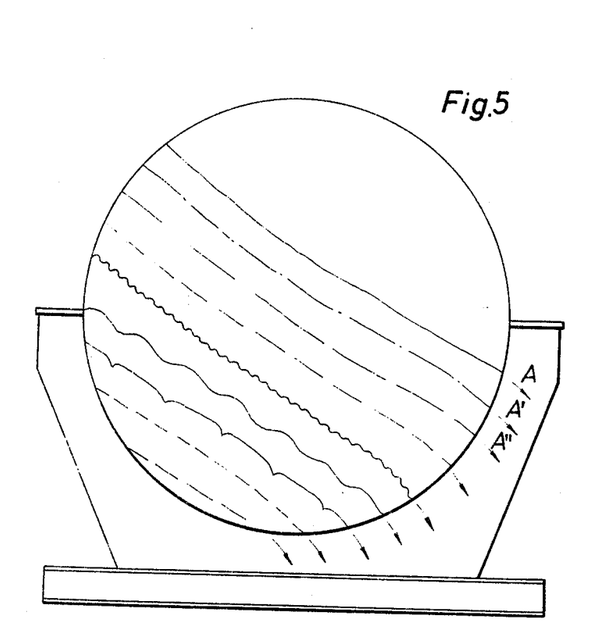
FIG. 5 is a schematical sectional view of the region of the annular gap, showing the successive laminations occurring in the discharging process and the dumping points thereof.
Figure 6:
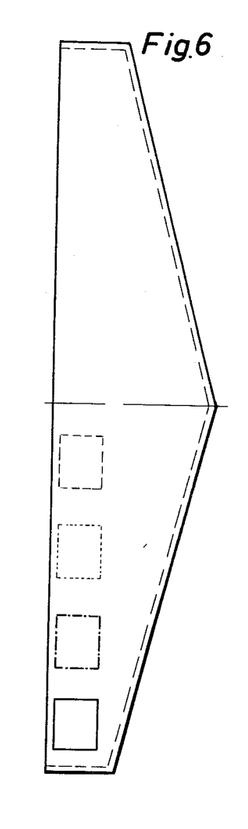
FIG. 6 shows a cover having a conical configuration and a cylindrical rim with apertures provided in said rim.
Figure 7:
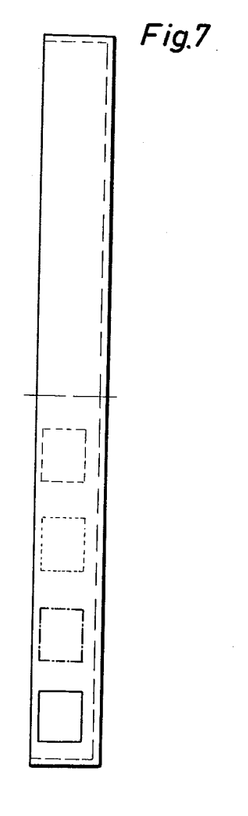
FIG. 7 shows a cover of the type according to FIG. 6, but having a flat wall.
Figure 8:
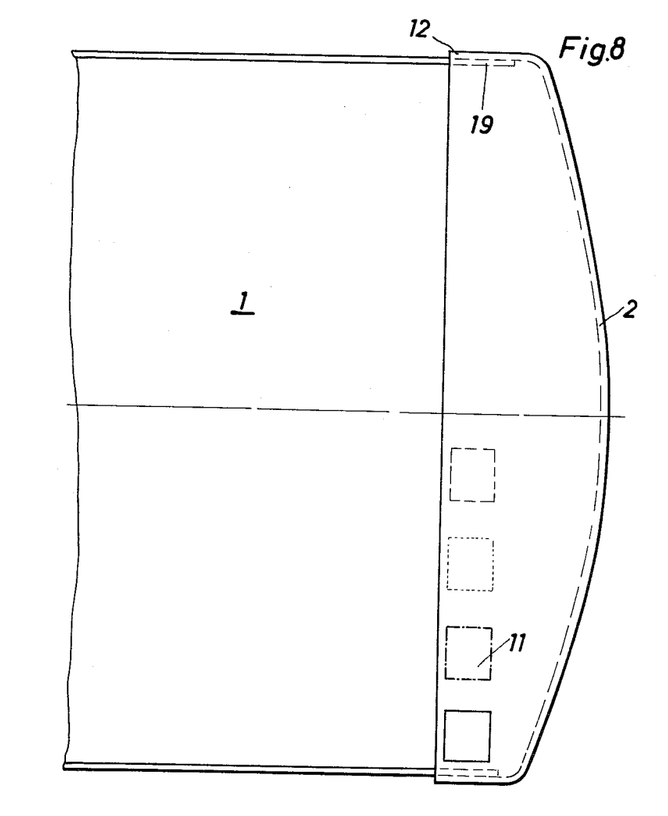
FIG. 8 shows a cover in a state as mounted and having an outwardly curved bottom wall and a rim of the type according to FIGS. 6 and 7.

Surprisingly, the accurate metering is obtained because of the fact that it is always the uppermost layer only that slips out-in lateral direction at a point (A), [from the annular gap] whereas the feed, regardless of the open annular gap, does not or in part only fall out from the lower portion. Naturally, point A is displaced in downward direction (A', A", etc.) with decreasing level of the feed material. Accordingly, no material is discharged in the stationary state of the container, and the discharge may also be varied by the tractor driver in order to adjust the metered quantity and the rate of discharge, by controlling the speed of rotation.

What I claim is:

1. A mixing and discharge apparatus for mixing feed and for uniformly discharging the mixed feed comprising a supporting frame, a hollow drum mounted for rotation on said frame for turning about a longitudinal axis of the drum, means providing an inlet opening into said drum for charging the same with feed, means defining an open discharge end for said drum through which mixed feed may discharge, conveyor plates fixed to the inner wall of the drum for turning with the drum to mix the feed while in said drum and for conveying the feed alone toward said discharge end of the drum, said conveyor plates providing the sole and only conveying of said material in said drum, a cover means mounted at the discharge end of said drum for movement between a closed postion covering said open discharge end of the drum and discharging position in which at least the lower marginal portion of said cover means is spaced from the drum to provide opening for the material to discharge, said cover means including a cover rotatable with said drum, guide means on the circumference of said drum, guide rods attached to said drum being mounted for sliding motion in said guide means, a cylinder means having a piston being located centrally of said cover, links extending radially between said piston and the ends of said guide rods, and anchoring members secured to said cover and supporting said links, said cover being moved by said links between its closed position and its discharge position, and a driven cross feed conveyor below the annular gap.

2. An apparatus in accordance with claim 1 in which said supporting frame is a wheeled frame adapted to be pulled by a tractor, a driven shaft means on said wheeled frame to be driven by a power take off of a tractor for turning said drum and for driving said cross feed conveyor.

3. An apparatus in accordance with claim 1 in which said driven cross feed conveyor comprises a conveyor screw being movable transversely of the longitudinal axis of the drum and adapted to be rotated in opposite directions.

* * * * *

UNITED STATES PATENT AND TRADEMARK OFFICE
CERTIFICATE OF CORRECTION

PATENT NO. : 4,100,617
DATED : July 11, 1978
INVENTOR(S) : Abraham Hoopman

It is certified that error appears in the above-identified patent and that said Letters Patent are hereby corrected as shown below:

Column 1, line 1, after the title, the following paragraph should be inserted:
--The present invention relates to a mixing and discharge apparatus in the form of a cylinder or drum mounted for rotation about its longitudinal axis and having a discharge opening in one of its end faces, as well as a feed mixing vehicle using a drum of this type.--

Column 3, line 46, "chassis" should read --chassis 2--.

Signed and Sealed this

Twenty-fourth Day of April 1979

[SEAL]

Attest:

RUTH C. MASON
Attesting Officer

DONALD W. BANNER
Commissioner of Patents and Trademarks